(12) United States Patent
Saraf et al.

(10) Patent No.: US 9,400,648 B2
(45) Date of Patent: *Jul. 26, 2016

(54) SOFTWARE UPGRADE ANALYSIS SYSTEM

(71) Applicant: Accenture Global Services Limited, Dublin (IE)

(72) Inventors: Sachin Saraf, Mumbai (IN); Vidyut Dinkar Kichambare, Pune (IN)

(73) Assignee: Accenture Global Services Limited, Dublin (IE)

( * ) Notice: Subject to any disclaimer, the term of this patent is extended or adjusted under 35 U.S.C. 154(b) by 74 days.

This patent is subject to a terminal disclaimer.

(21) Appl. No.: 14/294,114

(22) Filed: Jun. 2, 2014

(65) Prior Publication Data

US 2014/0282473 A1    Sep. 18, 2014

Related U.S. Application Data

(63) Continuation of application No. 12/183,482, filed on Jul. 31, 2008, now Pat. No. 8,745,611.

(30) Foreign Application Priority Data

Jun. 5, 2008    (IN) .......................... 1202/MUM/2008

(51) Int. Cl.
*G06F 9/44*    (2006.01)
*G06F 9/445*    (2006.01)

(52) U.S. Cl.
CPC .. *G06F 8/71* (2013.01); *G06F 8/65* (2013.01); *G06F 8/61* (2013.01); *G06F 8/68* (2013.01)

(58) Field of Classification Search
CPC ............... G06F 8/65; G06F 8/71; G06F 8/61; G06F 8/68

USPC .......................................... 717/170, 101, 174
See application file for complete search history.

(56) References Cited

U.S. PATENT DOCUMENTS 5,588,143 A      12/1996 Stupek
5,850,554 A  *   12/1998 Carver ..................... G06F 8/71
                                                        717/62

(Continued)

FOREIGN PATENT DOCUMENTS

JP         2005250892 A       9/2005

OTHER PUBLICATIONS

Canadian Examiner's Report for Application No. 2,666,002 dated Aug. 9, 2013 (4 pages).

(Continued)

*Primary Examiner* — Wei Zhen
*Assistant Examiner* — Mohammed Huda
(74) *Attorney, Agent, or Firm* — Fish & Richardson P.C.

(57) ABSTRACT

A system may include computer code for analyzing an upgrade from a first version to a second version of a software program that has been customized without performing the upgrade. The system may provide default state information of default program objects. The default program objects would be included in a default installation of the second version of the software program. The computer code may retrieve current state information of current program objects from an application database. The software program that has been customized may include the current program objects. The system may generate upgrade information based on a comparison between the current state information and the default state information. The upgrade information may identify a subset of the current program objects that would be impacted by the upgrade.

20 Claims, 4 Drawing Sheets

(56) References Cited

U.S. PATENT DOCUMENTS

| | | | |
|---|---|---|---|
| 6,367,077 | B1 | 4/2002 | Brodersen |
| 6,385,770 | B1 | 5/2002 | Sinander |
| 6,825,941 | B1 | 11/2004 | Nguyen |
| 7,191,435 | B2 | 3/2007 | Lau |
| 8,745,611 | B2 | 6/2014 | Saraf et al. |
| 2003/0130985 | A1 | 7/2003 | Driesen |
| 2003/0229890 | A1 | 12/2003 | Lau |
| 2005/0060392 | A1* | 3/2005 | Goring ............... G06F 9/4443 709/220 |
| 2005/0193269 | A1 | 9/2005 | Haswell |
| 2005/0257211 | A1* | 11/2005 | Chatterjee ............ G06F 8/67 717/170 |
| 2006/0117310 | A1 | 6/2006 | Daniels |
| 2006/0206866 | A1* | 9/2006 | Eldrige ............... G05B 15/02 717/122 |
| 2007/0006217 | A1* | 1/2007 | Tammana ............ G06F 8/61 717/174 |
| 2007/0220065 | A1 | 9/2007 | Coyle |
| 2007/0294684 | A1* | 12/2007 | Kumashiro ........... G06F 8/65 717/168 |
| 2009/0307650 | A1 | 12/2009 | Saraf et al. |

OTHER PUBLICATIONS

Canadian Examiner's Report for Application No. 2,666,002 dated Jun. 10, 2011 (3 pages).

European Search Report and Written Opinion, dated Oct. 21, 2009, pp. 1-7, European Patent Application No. 09251351.4-2211, European Patent Office, Germany.

Ishikawa, Japanese Office Action in corresponding Japanese Application No. 2009-130798, Jan. 31, 2012, 6 pages.

Tsukada, Japanese Office Action in co-pending Japnese Application Serial No. 2009-130798, mailed on Sep. 11, 2012 (6 pages).

Comparing Check Indicators/Field Values Afte Upgrade, http://help.sap.com, downloaded Jul. 18, 2008.

Design and Implementation of Authorization Concepts for SAP R/3 and SAP Enterprise Portals, SAP Authoriztion System, IBM Business Consulting Services, published 2003.

First Installation Procedure, http://help.sap.com, downloaded Jul. 18, 2008.

Li, L., Offutt, A., Algorithmic Analysis of the Impact of Changes to Object-Oriented Software, dated Nov. 4, 1996, pp. 171-184, IEEE Computer Soc., Los Alamitos, CA.

SAP R/3 Security Upgrade, Yvette Smith, erpgenre.com, downloaded May 7, 2008.

Upgrade Procedure, http://help.sap.com, downloaded Jul. 18, 2008.

India Patent Office First Examination Report for Application No. 1202/MUM/2008 dated Mar. 6, 2014, 2 pages.

U.S. Final Office Action for U.S. Appl. No. 12/183,482 dated Apr. 12, 2012, 30 pages.

U.S. Non-Final Office Action for U.S. Appl. No. 12/183,482 dated Oct. 17, 2011, 28 pages.

U.S. Non-Final Office Action for U.S. Appl. No. 12/183,482 dated Jun. 7, 2013, 28 pages.

U.S. Notice of Allowance for U.S. Appl. No. 12/183,482 dated Jan. 24, 2014, 10 pages.

\* cited by examiner

| 4.7 PARENT ROLE | TCode Changes | Check Ind Changes | Auth Objects Changes | Org Elements changes | No. Field Value Changes | Auth Group Changes | Total |
|---|---|---|---|---|---|---|---|
| Y,BC_ADD_ON_TABU_CLI | 0 | 0 | 0 | 0 | 0 | 0 | 0 |
| Y,BC_ADM_BW_DATA_LOADS | 0 | 0 | 0 | 0 | 0 | 0 | 0 |
| Y,BC_ADM_INFO_PAK | 1 | 0 | 0 | 0 | 0 | 0 | 1 |
| Y,BC_ADM_MASS_USER_MAIN | 0 | 0 | 0 | 0 | 11 | 0 | 11 |

Figure 3

| IMPACTED PARENT ROLE | OLD TCODE | NEW TCODE |
|---|---|---|
| Y,BC_ADM_INFO_PAK | /RWD/ZF0 | OBSOLETE |
| Y,BC_AUDI_DATA_PROT | SM37 | SCMA |
| Y,BC_AUDI_DATA_PROT | ST03 | ST03N |
| Y,BC_AUDI_DATA_PROT | STAT | STAD |
| Y,BC_AUDI_FI | S_P6B_12000051 | OBSOLETE |

Figure 4

SOFTWARE UPGRADE ANALYSIS SYSTEM

This application is a continuation of U.S. application Ser. No. 12/183,482, filed Jul. 31, 2008, which claims priority under 35 U.S.C. §119(a) to India Patent Application No. 1202/MUM/2008, filed Jun. 5, 2008, the entire contents of which are hereby incorporated herein by reference.

BACKGROUND

1. Technical Field

This application relates to software installation and, in particular, to software upgrades.

2. Related Art

Software programs can be large and complex. Such software programs may be difficult and time-consuming to install and/or upgrade. Enterprise business applications have been known to take months to upgrade. In some examples, users may alter the way they use a software program after an upgrade due to changes in the software program introduced in the upgrade. Additionally, software programs may be modified or customized prior to an upgrade. An upgrade may cause one or more modifications to fail or work improperly. Consequently, the impact of an upgrade of a software program may be of interest in order to plan for an upgrade of the software program in a production system.

In order to determine the impact of an upgrade of a software program, a test system may be used. A test system may include a copy of the software program currently in use in a production system. The copy of the software program may then be upgraded without disrupting users of the production system. The impact of the upgrade may then be analyzed in the test system. It may be more efficient, however, to analyze the impact of a software upgrade without having to perform an upgrade either on the operational system or the test system.

SUMMARY

In one example, a system for analyzing an upgrade of a first version of a software program in a modified form to a second version of the software program in the modified form without performing the upgrade may include computer code. The computer code may provide default state information of default program objects. The default program objects would be included in a default installation of the second version of the software program in an unmodified form. The computer code may also retrieve current state information of current program objects from an application database. The software program in the modified form may include the current program objects. The computer code may generate upgrade information based on a comparison between the current state information and the default state information. The upgrade information may identify a subset of the current program objects that would be impacted by the upgrade.

In another example, a method of analyzing impacts of performing an upgrade from a first version to a second version of a software program in a modified form without performing the upgrade may include providing default state information in a repository database. The default state information may include differences between a first set of default program objects and a second set of default program objects. The first set of default program objects would be included in a default installation of the first version of the software program in an unmodified form. The second set of default program objects would be included in a default installation of the second version of the software program in an unmodified form. The method may further include retrieving current state information related to current program objects from an application database. The first version of the software program in the modified form may include the current program objects. The method may also include comparing the current state information with the default state information in order to generate upgrade information. The upgrade information may identify a subset of the current program objects that would be impacted by the upgrade.

In yet another example, a computer program product for use in a computer to analyze an impact of performing an upgrade from a first version to a second version of a software program in a modified form without performing the upgrade may include a computer readable medium. The computer readable medium may include computer executable program code physically embodied therein and default state information. The default state information may include differences between a first set of default program objects and a second set of default program objects. The first set of default program objects would be included in a default installation of the first version of the software program in an unmodified form. The second set of default program objects would be included in a default installation of the second version of the software program in an unmodified form. The computer program product may further include computer executable program code to cause a processor of a computer to retrieve current state information of current program objects from an application database. The software program in the modified form may include the current program objects. The computer program product may also include computer executable program code to cause the processor to generate upgrade information based on a comparison between the current state information and the default state information. The upgrade information may identify a subset of the current program objects that would be impacted by the upgrade.

Further objects and advantages of the present invention will be apparent from the following description, reference being made to the accompanying drawings wherein preferred embodiments of the present invention are clearly shown.

BRIEF DESCRIPTION OF THE DRAWINGS

The innovation may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 3 illustrates a portion of an example summary report that includes statistics of the impacts on parent roles generated from the upgrade information;

FIG. 4 illustrates a portion of an example report generated from the upgrade information that identifies the revised and obsolete transaction codes associated directly or indirectly with parent roles.

DETAILED DESCRIPTION

The impact of an upgrade may be determined without performing the upgrade on a test system. In an example embodiment, a system to analyze an upgrade of a first version of a software program to a second version of the software program without performing the upgrade may include an upgrade analysis tool. The upgrade analysis tool may include, for example, a .NET standalone application. The upgrade analysis tool may retrieve state information of program objects from an application database, where the program objects are included in a first version of a software program. For example, the upgrade analysis tool may retrieve the state information from an Oracle database, which is used by a first version of an Enterprise Resource Planning (ERP) application to store program objects. The program objects included in the ERP application may include, for example, security related objects such as security roles, transaction codes, authorization objects, etc. The state information of the security roles may include, for example, names of each of the security roles.

The upgrade analysis tool may compare the state information retrieved from the application database with default state information provided in a repository database. The repository database may include, for example, a Microsoft SQL Server database. Database entries in the SQL Server database may identify differences between a first set of default program objects and a second set of default program objects. The first set of default program objects would be installed in a default installation of the first version of the ERP application. The second set of default program objects would be installed in a default installation of the second version of the ERP. The identified differences may include, for example, details of the changes to default security objects such as transaction codes, authorization objects, etc. The details of the changes may include indication of whether the default security objects are revised, obsolete, or newly added.

The upgrade tool may generate upgrade information that identifies impacts or potential impacts of the upgrade on the program objects. The upgrade tool may generate the upgrade information based on a comparison between the default state information and the state information retrieved from the application database. For example, the upgrade information may identify a security role that would be impacted because a transaction code associated with the security role is obsolete in the second version of the ERP application.

Figure 1:
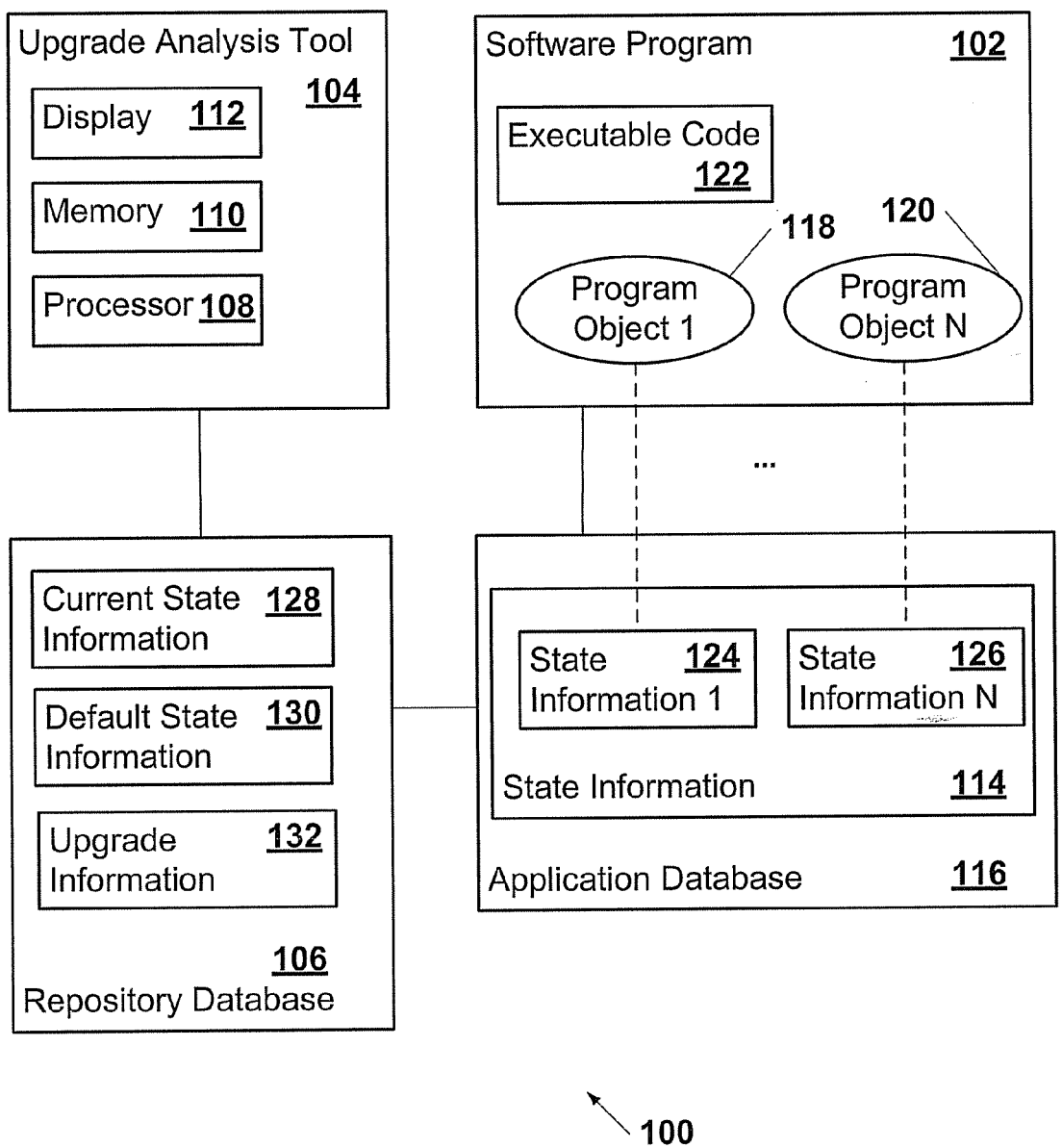
FIG. 1 is an example of a system to analyze an upgrade of a first version of a software program to a second version of the software program in without performing the upgrade.

FIG. 1 is an example of one embodiment of a system 100 to analyze an upgrade of a first version of a software program 102 to a second version of the software program in without performing the upgrade. The system 100 may include an upgrade analysis tool 104 and a repository database 106. The system 100 may include additional, different, or fewer components. For example, the system may 100 may include a network over which the upgrade analysis tool 104 communicates with the repository database 106.

The upgrade analysis tool 104 may be any device or combination of devices configurable to execute computer code with one or more processors, such as a computer, a server, a mobile computer, and a Personal Digital Assistant. The upgrade analysis tool 104 may include a processor 108, a memory 110, and a display 112. The upgrade analysis tool 104 may include additional, different, or fewer components. For example, the upgrade analysis tool 104 may not include a display 112 and just generate upgrade analysis information about an upgrade without displaying that information. That upgrade analysis information may be transmitted for display or output on other systems.

The processor 108 may be in communication with the memory 110, the display 112, and/or other components included in the system 100. The processor 108 may be a general processor, central processing unit, server, application specific integrated circuit (ASIC), digital signal processor, field programmable gate array (FPGA), digital circuit, analog circuit, or combinations thereof. The processor 108 may be one or more processors or devices operable to execute computer code. The computer code may be written in any programming language now known, or later discovered, such as Java, C#, C++, PHP, assembly language, and Visual Basic.

The memory 110 may be any now known, or later discovered, storage device. The memory 110 may be a non-volatile and/or volatile memory, such as a random access memory (RAM), a read-only memory (ROM), an erasable programmable read-only memory (EPROM), or flash memory. The memory 110 may include an optical, magnetic (hard-drive) or other memory device.

The display 112 may be any electro-optical device for displaying data, such as a liquid crystal display (LCD), a cathode ray tube (CRT), an electro-luminescent display, a plasma display panel (PDP), a vacuum florescent display (VFD), or other display device.

The upgrade analysis tool 104 may be any type of application now known or later developed, which incorporates the system components and methods described herein. In some examples, the upgrade analysis tool 104 may include a standalone application. In other examples, the upgrade analysis tool 104 may include a web-based application. In still other examples, the upgrade analysis tool 104 may be a client/server application.

The upgrade analysis tool 104 may communicate with the repository database 106. The repository database 106 may by any database. In some examples, the repository database 106 may be included in the upgrade analysis tool 104. In other examples, the repository database 106 is not included in the upgrade analysis tool 104.

A database may be a memory including any electronic collection of information. For example, the database may include information organized so that the information may be accessed, managed, and updated, such as a Relational Database Management System (RDBMS), an object-oriented database, an extensible markup language (XML) database, a file system, memory structures, or other now known or later developed databases. The database may use any type of memory and structure, such as a random access memory (RAM), a read-only memory (ROM), an erasable programmable read-only memory (EPROM), flash memory, optical memory, magnetic (hard-drive or tape) memory or other memory device.

The database may include database entries. A database entry is information that may be retrieved from or stored in the database. The database entry may be accessed or looked-up using a unique key, such as a primary key value, a full path name, or a memory address. For example, the database entry may be a row in a table in an RDBMS. In other examples, the database entry may be stored across multiple locations in the database, such as across multiple tables in an RDBMS. A table in an RDBMS may include one or more columns. The database may include a collection of databases.

One or more database entries may be associated in the database with one or more other database entries. For example, a first security role entry may be associated with a second security role entry, where a corresponding parent security role includes a corresponding child security role.

Any method of associating database entries in a database, now known or later discovered, may be used. In some examples, a first database entry is associated with a second database entry by including a unique key in the second database entry to identify the first database entry. In other examples, the first database entry is associated with the second database entry by including a unique key in the first database entry to identify the second database entry. In still other examples, the database includes an association database entry, where the association database entry includes a unique key to indentify the first database entry and a unique key to identify the second database entry.

The upgrade analysis tool 104 may retrieve state information 114 from an application database 116. The application database 116 may be any database that contains state information 114 of program objects 118 and 120, where the software program 102 includes the program objects 118 and 120. The software program 102 may be any installed application or combination of applications, such as an Enterprise Resource Planning application, a Customer Relationship Management application, an accounting program, a tax application, and a word processing application. The software program 102 may include executable code 122 that when executed instantiates one or more program objects, 118 and 120. A program object, 118 and 120, is a conceptual entity that may contain data and/or a portion of the executable code 122 that operates on the data. The program object 118 and 120 may, for example, appear to the executable code 122 as a contiguous block of computer memory of a specific size at a specific location, even if elements of the program object are not physically stored in a contiguous block of memory. Thus, a program object 118 and 120 may represent one or more variables in a procedural programming model, and/or one or more variables or objects in an object-oriented programming model. Examples of a program object 118 and 120 may include a sales order, a company, a contact, a product, a security role, a business unit, and an employee. Each of the program objects 118 and 120 may also have a type. For example, the type may be class, a collection of classes, a data type, a primitive data type, or any other structure common to each of the program objects 118 and 120 of that type. The data included in each of the program objects 118 and 120 is known as state. The software program 102 may store state information 124 or 126 of one or more of the program objects 118 and 120 in the application database 116. For example, the state information 124 or 126 of an employee program object 118 and 120 may include an employee number, an employee name, and a department number. The state information, 124 or 126 of each of the respective program objects 118 and 120 may include the state, a portion of the state, and/or information related to the state of each of the respective program objects 118 and 120. The state information 114 stored in an application database 116 may include the state information 124 or 126 of each of the program objects 118 and 120 and/or information related to the state information 124 or 126 of each of the program objects 118 and 120.

In other examples, the repository database 106 instead of the upgrade analysis tool 104 may retrieve the state information 114 from the application database 116. In such examples, the repository database 106 may provide one or more database links permitting database commands operating on the database links to actually operate on tables in the application database 116. In still other examples, the upgrade analysis tool 104 or the repository database 106 also stores the state information 114 retrieved from the application database 116 as current state information 128 in the repository database 106. For example, the repository database 106 may include a snapshot of a portion of the application database 116. The current state information 128 may be the same as or different from the state information 114.

The repository database 106, in addition to or instead of the current state information 128, may include default state information 130. The default state information 130 is described below in relation to FIG. 2. As is also described below, the upgrade analysis tool 104 may generate upgrade information 132. The upgrade information may identify a subset of the program objects 118 and 120 that would be impacted by the upgrade of the software program 102 from the first version to the second version. In some examples, the upgrade information 132 may be stored in the repository database 106. In other examples, the upgrade information 132 may be transmitted to another device or process for further processing, for display and/or for storage.

Figure 2:
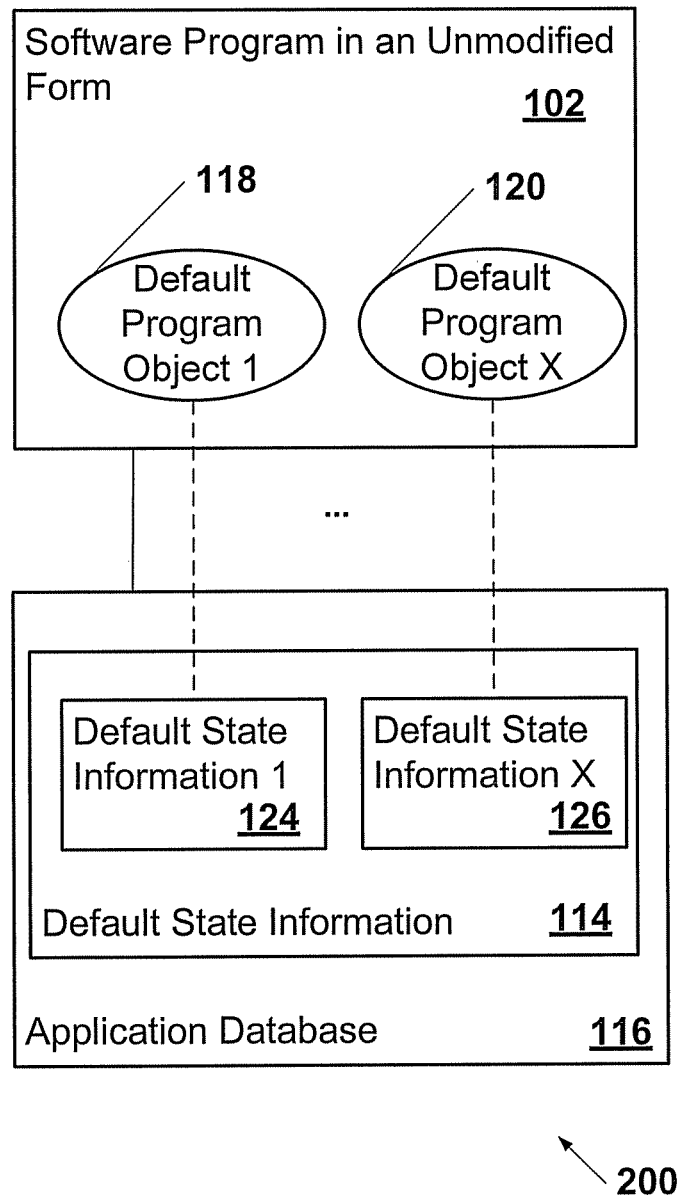
FIG. 2 is an example of a test system that includes a software program in an unmodified form and an application database.

FIG. 2 is an example of another embodiment of a test system 200 that includes a software program 102 in an unmodified form and an application database 116. When the software program 102 is first installed, the software program 102 may include one or more default program objects 118 and 120. For example, when an ERP application is first installed, the ERP application may include a default set of security related objects, organizational units, products, and/or customers. Each of the default program objects 118 and 120 may include respective default state information 124 and 126 stored in the application database 116. The default state information 114 stored in an application database 116 may include the default state information 124 or 126 of each of the default program objects 118 and 120 and/or information related to the default state information 124 or 126 of each of the default program objects 118 and 120.

The software program 102 may be considered to be in an unmodified form when first installed. As the software program 102 is used, the program objects 118 and 120 may be modified, removed, added, or left unchanged by users of the software program. The software program 102 may be considered to be in a modified form after a user modifies, removes, or adds one or more of the program objects 118 and 120. If the user has not modified, removed, or added one or more of the program objects 118 and 120, but a program object 118 and 120 has been modified, removed, or added by merely executing the software program 102, the software program 102 is still considered to be in an unmodified form.

The software program 102 installed in the test system 200 may be a first version of the software program 102 and/or a second version of the software program 102. In one example, the second version of the software program 102 may be installed separately from the first version. In another example, the first version of the software program 102 may be upgraded to the second version of the software.

The first and second versions of the software program 102 in an unmodified form may include fewer, greater, different, and/or modified default program objects 118 and 120. Differences between the default program objects 118 and 120 of the first version and the default program objects 118 and 120 of the second version may be determined with an automatic process and/or manually. For example, one may determine which of the program objects 118 and 120 of a particular type in the first version no longer exist in the second version. A database command, for example, may be transmitted to the application database 116 in the test system 200 to make such a determination, where default state information 114 from both the first version and the second are included in the application database 116. In another example, one may determine which of the program objects 118 and 120 of the particular type in the first version have been added in the second version. In yet another example, one could manually examine the program objects 118 and 120 of a particular type in the first version and in the second version to determine which of the program objects 118 and 120 of the first version have been replaced by a different program object 118 and 120 in the second version. In still another example, one or more of the differences may be identified by a developer of the software program 102 and provided in the application database 116 through an installation of and/or upgrade to the second version. A set of modified default program objects may include one or more of the default program objects 118 and 120 that would be replaced, added, removed, or have one or more attributes altered in such an upgrade.

A program object may be considered revised if the program object has been replaced or had one or more attributes altered. A program object may be considered obsolete if the program object has been removed. A program object may be considered modified or changed if the program object has been either revised or is obsolete.

In one example, differences between the default program objects 118 and 120 of the first version and the default program objects 118 and 120 of the second version of the software program may be stored as the default state information 130 in the repository database 106 of FIG. 1. In a different example, default state information 114 of a second version of the software program 102 in an unmodified from may be stored as the default state information 130 in the repository database 106. In the latter example, differences between the default program objects 118 and 120 of the first version and the second version may be determined by comparing the default program objects 118 and 120 of the second version included in the program objects 118 and 120 of the first version of the software program 102 in a modified form.

The upgrade analysis tool 104 may generate the upgrade information 132 based on a comparison of the default state information 130 with the current state information 128. The upgrade analysis tool 104 may therefore reuse the default state information 130 when analyzing any given installation of the first version of the software program 102 in a modified form without performing an upgrade.

As noted above, the upgrade information 132 may identify the subset of the program objects 118 and 120 that would be impacted by an upgrade from the first version to the second version of the software program 102 in a modified form. Of course, any of the program objects 118 and 120 that are included in the set of modified default program objects may be impacted by the upgrade. For example, if a default authorization object included in the default program objects is removed in an upgrade of the software program 102 in an unmodified form, and the default authorization object is included the software program 102 in a modified form, the default authorization object may also be removed in an upgrade of the software 102 in a modified form. Any of the program objects 118 and 120 that are directly or indirectly associated with the set of modified default program objects may also be impacted by the upgrade. For example, if a security role is included in the software program 102 in the modified form, and the security role is indirectly associated with an obsolete default authorization object, the security role may be impacted by an upgrade because the security role would potentially lose an indirectly associated authorization object in the upgrade.

In contrast, program objects 118 and 120 that are unassociated with the set of modified default program objects may not be impacted by the upgrade. For example, if a new supplier object is included the software program 102 in a modified form, but has no relation to the default security role, removal of the default security role may have no impact on the new supplier object. Thus, the relationships between the modified default program objects and the program objects 118 and 120 may be used to identify the subset of the program objects 118 and 120 that would be impacted by the upgrade. These relationships may be hereafter referred to as program object relationships.

The subset of the program objects 118 and 120 that would be impacted by the upgrade may be determined from a comparison of the set of modified default program objects with the program objects 118 and 120 included in the software program 102 in a modified form. A similar result may be achieved by comparing state information of those program objects. Therefore, the upgrade information 132 may be based on the comparison of the default state information 130 and the current state information 128 (state information 114). The comparison may be made in view of the program object relationships.

The comparison may include a comparison of all program objects 118 and 120 in some examples. However, in other examples, program objects 118 and 120 may be selectively compared. One reason may be that not all types of program objects may be of interest. For example, modified default program objects of a type that are likely to be removed in the software program 102 of a modified form may not be of interest. As an example, default customer objects in an ERP application will likely be removed in the modified form. Additionally, other program objects in the ERP application in the modified form are not likely to have a relationship with the default customer objects because the default customer objects will likely be removed. As another example, one or more types of program objects may be automatically upgraded during the upgrade. For example, sale orders in an ERP application may be upgraded automatically during the upgrade and may need no further manual analysis or modification after performing an upgrade.

In contrast, any type of program object that may need a manual analysis and/or modification after performing an upgrade may be of interest. For example, the type of program objects 118 and 120 related to security in an ERP application may be of interest because many default security objects are retained in the ERP application in a modified form, and many new, security objects and other types of objects may be related to security objects. Thus, objects related to a security feature may be of particular interest. In another example, default program objects 118 and 120 retained yet associated with other program objects 118 and 120 may be of interest. For example, program objects 118 and 120 such as database tables and display screens may have such characteristics. If a database field of a database table were added during an upgrade, a display screen that stores to and/or retrieves from the database table may need to be changed to account for the added database field.

A detailed example may further illustrate the operation of one embodiment of the upgrade analysis tool 104. An ERP application may include many different types of program objects 118 and 120. The program objects 118 and 120 may include program objects related to security. For example, security related program objects 118 and 120 of an SAP ERP application may include roles, profiles, authorization objects, authorization fields, authorization values, authorization groups, and check indicators. The security objects provide a mechanism for controlling access to certain program objects referred to as object classes. Examples of object classes include sales orders, suppliers, customers, and other business objects. Each of the object classes may have one or more corresponding database tables in the application database 116 to store respective state information 124 and 126. An object class may have a one-to-many relationship to authorization objects. Each of the authorization objects identifies a set of permissible activities, such as read and/or write. Each of the authorization objects may have a many-to-many relationship to authorization fields. An authorization field may identify a field in one of the database tables.

A process and/or thread executing within the ERP application may attempt to access a program object of an object class such that one or more of the database fields are accessed. Each authorization object may be checked that is both associated with the object class and associated with authorization fields, where the authorization fields are associated with the one or more database fields accessed. Access may be granted if the access is a permissible activity included in the set of permissible activities identified by the authorization object being checked.

Furthermore, the authorization object may have a one-to-many relationship to authorization values. Authorization values permit an additional level of access control based on a value of the accessed field. A given authorization value may identify an authorization field and an allowed value. Access may be granted if a value in a field for which access is being attempted matches the allowed value. For example, a job order may exist for a particular plant in a manufacturing facility. A database table may contain state information, 124 or 126, of the job order program object, 118 or 120. The database field may contain a database field with a value that identifies the particular plant. Access may be granted where an attempt is made to modify the job order program object, if the following conditions are met: (1) the value that identifies the particular plant is included in an authorization value; (2) the authorization value is associated with an authorization object; (3) the authorization object is associated both with a job order object class and with an authorization field object for the database field with the value that identifies the plant; and (4) the authorization object specifies write as a permissible activity. An allowed value may identify a range of permissible values instead just a specific value.

A profile may be a collection of authorization values grouped together, for example, to perform a business activity or part of a business activity. Profiles may have a many-to-many relationship to authorization values.

A role may include zero, one, or multiple profiles. Roles may have a one-to-many relationship to profiles. A user may be assigned one or more roles to control access by the user to one or more object classes. A role may have one or more parent roles and/or one or more child roles. A role may also be assigned to a transaction code.

A transaction code, or tcode, may identify a particular business activity in ERP application. For example, a tcode might be "MM01" and identify a business activity of creating a material object in the ERP application. The tcode may be used, for example, to identify a display screen or collection of display screens that are used to create the material object. Because certain roles may provide access privileges that enable a business activity or part of a business activity, roles may be associated with a transaction code. Roles may have a many-to-many relationship with transaction codes. Additionally, authorization objects may be associated with transaction codes for similar reasons.

When accessing a program object of a given object class during a business activity identified by a tcode, the authorization objects associated with the object class may not be checked as described above. A check indicator object may include a check flag and a mapping between a transaction code and an authorization object. The check flag indicates whether the authorization object should be checked for the transaction code. Thus, access control governed by the authorization objects may be selectively enabled or disabled through the check indicator without removing or creating any of the authorization objects.

Authorization groups may provide an alternative access control mechanism. Authorization groups may control access to database tables and one or more database fields of those database tables. Authorization groups may be used when the ERP application generates reports that may operate at the table level instead of at the object class level. Authorization groups may have a many-to-many relationship to database tables.

The relationships between the security related program objects 118 and 120 described above may be used to design a tailored comparison of the current state information 128 with the default state information 130 stored in the repository database 106. The tailored comparison may identify the program objects 118 and 120 that would be impacted by an upgrade and that would be of interest.

For example, the comparison may be designed to determine the impact on roles. The comparison may be further designed to determine the impact on parentless parent roles, which may be parent roles that are not child roles of another role. The reason is that if a child role would be impacted by the upgrade, then the parent role, by implication, would also be impacted.

FIG. 3 illustrates a portion of an example summary report that includes statistics of the impacts on parent roles generated from the upgrade information 132. Each of the rows in the report may correspond to a parent role. Alternatively, each of the rows in the report may correspond to a parent role that does not have a parent. The middle six columns include statistics that indicate the number of a given type of program objects that would change in an upgrade, where the program objects are either directly or indirectly related to the role on each row.

For example, the number in a "TCode Changes" column indicates the number of transaction codes that were changed that are associated with the role or with any direct or indirect child role of the role. The default state information 130 may include a list of all of the default transaction codes that would be changed in an upgrade. For example, a first database table included in the default state information 130 may include every default transaction code in the ERP application that would be changed in the upgrade. A second database table included in the current state information 128 may include every role in the ERP application and any associated transaction code. A third database table included in the current state information 128 may include identification of any associated parent roles and/or child roles of each of the roles in the ERP application. A comparison of the first database table with the second and third database tables may be made using one or more structured query language (SQL) commands. These SQL commands may calculate the number of default transaction codes that would be modified and that are associated with the parent role either directly or indirectly. For example, each default transaction code that is modified and is associated with a child role of a parent role, may be included in the number for the parent role. This example is an example of identifying a program object as impacted by an upgrade because another object indirectly associated with the program object would be modified in the upgrade. A program object is indirectly associated with another program object when the program object is associated with the other program object through one or more other objects.

In another example, the number in a "Check Ind Changes" column may indicate the number of check indicators having a check flag value that would be modified in an upgrade. Each of the check indicators included in the number may be associated with a transaction code that is in turn associated with the role or with any direct or indirect child role of the role. This example is also an example of identifying a program object as impacted by an upgrade because another object indirectly associated with the program object would be modified in the upgrade.

In yet another example, the number in an "Auth Objects Changes" column may indicate the number of default authorization objects that would be modified in an upgrade. Each of the default authorization objects counted may be associated with one or more authorization values that are in turn associated with one or more profiles that are in turn associated with the role or with any direct or indirect child role of the role.

In still another example, the number in an "Org Element Changes" column may indicate the number of modified authorization objects that contain organization element fields that impact the specific security role. Organization elements may be a hierarchical set of elements that describe the structure of a business organization. For example, a business unit may have one or more facilities and each of the facilities may have one or more plants. Available organization elements may be stored in an organization element database table. An authorization object may include an organization element field that corresponds to a database field that identifies an organization element associated with a particular program object. An organization element field may not inherit values from a parent role as other authorization fields may do. Consequently, values of an organization element in a derived security role may have to be populated manually instead of simply being inherited. If an authorization object includes an organization element field and the authorization object would be obsolete in an upgrade, derived security roles that may have been populated manually may need to be changed. If an authorization object includes an organization element field in a first version of the software program, but not in a second version of the software program, derived security roles may also need to be changed. If an authorization object includes an organization element field added in the second version of the software program, derived security roles may need to be changed.

FIG. 4 illustrates a portion of an example report generated from the upgrade information 132 that identifies modified transaction codes associated with parent roles. This is an example of when the upgrade information 132 may specifically identify modified program objects associated with a given program object. The upgrade information 132 may also indicate how a modified program object is modified (for example by indicating whether the modified program object is revised or obsolete). The upgrade information 132 may further indicate the revised value when a program object is modified. The upgrade information 132 may also identify a range of values of an attribute of revised or obsolete program objects directly or indirectly associated with the given object. An attribute, or property, of a program object may be value or object included in the program object. For example, a field object may indicate what database table and database field contains state information of an attribute of a program object. For example, for a given role and/or parent role, the upgrade information 132 may include, for each of the first version and the second version, a range of permissible values of a field for each unique combination of transaction code and authorization object associated directly or indirectly with the given role.

In some examples, the default state information 130 in the repository database 106 may include state information related to more than two versions of the software program 102. The upgrade analysis tool 104 may determine a current version of the software program 102 to be analyzed and a desired version to which to upgrade. If the default state information 130 includes information on the current version and the desired version, then the upgrade analysis tool 104 may continue to analyze the upgrade.

The application database 116 from which the upgrade analysis tool 104 retrieves the state information 114 may not be the production application database 116 in which the software program 102 stores the state information 124 and 26 of the program objects 118 and 120. The upgrade analysis tool 104, a different application, or a combination of applications may extract the state information 114 from the production application database 116 into the application database 116 from which the upgrade analysis tool 104 retrieves the state information 114. The latter application database 116 may be, for example, a text file with comma separated values. The state information 114 retrieved by the upgrade analysis tool 104 and/or extracted from the production application database 116 may be limited to information related to the state information 124 and 126 of program objects 118 and 120 related to one or more features. For example, the state information 114 retrieved by the upgrade analysis tool 104 may be limited to information related to security program objects and program objects associated with the security program objects.

Figure 5:
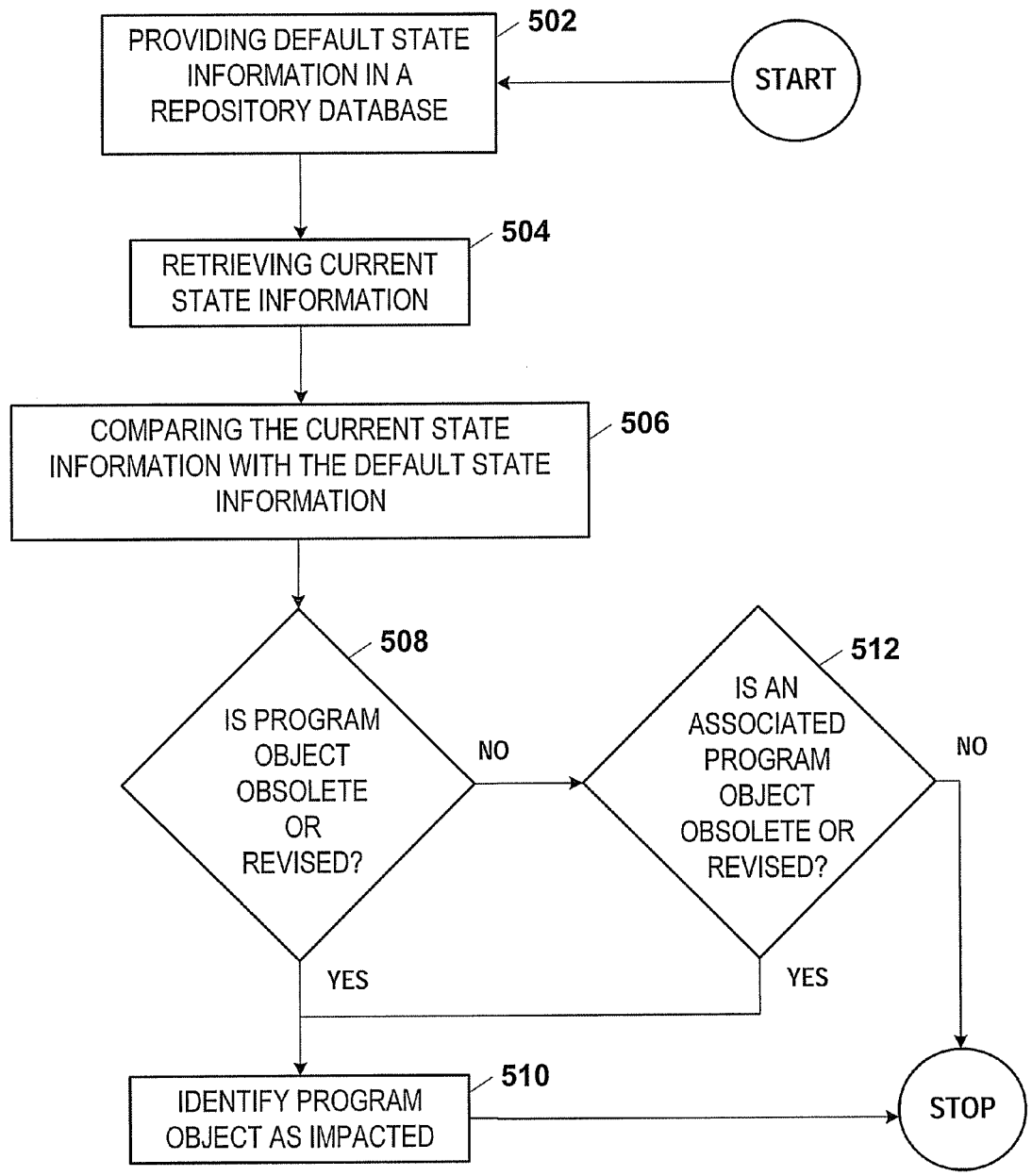
FIG. 5 illustrates one example of a method included in a system to analyze impacts of performing an upgrade from a first version to a second version of a software program in a modified form without performing the upgrade.

FIG. 5 illustrates one example of a method included in a system 100 to analyze impacts of performing an upgrade from a first version to a second version of a software program 102 in a modified form without performing the upgrade. Additional, different, or fewer acts may be performed. The acts do not need to be performed in the order shown in FIG. 5.

In act 502 of the example illustrated in FIG. 5, the operation may begin by providing the default state information 130 in a repository database 106. In act 504, the operation may continue by retrieving the current state information 119 from an application database 116. In act 506, the operation may also continue by comparing the current state information 119 with the default state information 130 to generate upgrade information 132. The upgrade information 132 may identify a subset of the current program objects 118 and 120 that would be impacted by the upgrade.

The act 508 of checking whether each of the current program objects 118 and 120 is obsolete or revised may be included in the act 506 of comparing the current state information 119 with the default state information 130. If a current program object 118 and 120 is obsolete or revised, then the operation may continue to act 510 of identifying the current program object as impacted. Act 510 of identifying the current program object as impacted may also be included in the act 506 of comparing the current state information 119 with the default state information 130.

If the current program object 118 and 120 is not obsolete or revised, then the operation may continue to act 512 by checking whether any program object associated with the program object is obsolete or revised. If any program object associated with the program object is obsolete or revised, then the operation may continue to act 510 by identifying the current program object as impacted. Act 512 of checking whether any program object associated with the program object is obsolete or revised may be included in the act 506 of comparing the current state information 119 with the default state information 130.

In some examples, the upgrade analysis tool 104 may operate on a subset of information stored in a production application database 116. Operating on a subset of information may be advantageous because potentially highly confidential information may remain in the production application database 116 without being exported. The upgrade analysis tool 104 may also execute without performing the upgrade. Not performing an upgrade may be advantageous because even on a test system, performing an upgrade may be difficult. Even if an upgrade were performed on a test system, identifying which program objects 118 and 120 may have been impacted may be difficult to determine. Identification of impacted program objects may involve manually examining each program object after an upgrade. In some examples, the upgrade analysis tool 104 may automatically identify which program objects 118 and 120 may have been impacted and which program objects 118 and 120 may not have been impacted. The upgrade analysis tool 104 may, in some examples, display the upgrade information 132, thereby allowing a user to further analyze the impacted program objects 118 and 120.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other machine-readable media, for example, secondary storage devices such as hard disks, floppy disks, and CD-ROMs; a signal received from a network; or other forms of ROM or RAM either currently known or later developed. Moreover, the various modules and screen display functionality is but one example of such functionality and any other configurations encompassing similar functionality are possible.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. Programs may be parts of a single program, separate programs, or distributed across several memories and processors.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A system for analyzing an upgrade of a first runtime version of a software program in a modified form to a second runtime version of the software program in the modified form without performing the upgrade, the system comprising:
   one or more processors to:
   retrieve default state information of a plurality of default program objects included in a default installation of the second runtime version of the software program in an unmodified form;
   retrieve, from an application database, current state information of a plurality of current program objects included in the first runtime version of the software program in the modified form, the modified form of the first runtime version of the software program reflecting user modification, addition, and removal of one or more program objects included in an unmodified form of the first runtime version of the software program when first installed; and
   compare the current state information for the modified form of the first runtime version of the software program with the default state information for the default installation of the second runtime version of the software program in the unmodified form to generate upgrade information by:
     for each of the current program objects included in the first runtime version of the software program in the modified form:
       determining whether a current program object in the modified form of the first runtime version of the software program is obsolete or revised in the default installation of the second runtime version of the software program in the unmodified form; and
       based on a determination that the current program object in the modified form of the first runtime version of the software program is obsolete or revised in the default installation of the second runtime version of the software program in the unmodified form, identifying the current program object as impacted; and
     generating upgrade information that identifies a subset of the current program objects identified as being impacted by the upgrade of the first runtime version of the software program in the modified form to the second runtime version of the software program in the modified form in response to identifying at least one of the current program objects as impacted.

2. The system of claim 1, where the one or more processors are further to:
   retrieve the default state information from a repository database; and
   store the current state information in the repository database.

3. The system of claim 2, where the one or more processors are further to:
   transmit database commands to the repository database to populate upgrade information database tables from a plurality of default state database tables and from a plurality of current state database tables, the default state information being stored in the default state database tables, the current state information being stored in current state database tables, and the upgrade information being stored in the upgrade information database tables.

4. The system of claim 1, where the current program objects relate to a feature of the software program, and the software program in the modified form includes other current program objects.

5. The system of claim 4, where the feature of the software program includes a security feature.

6. The system of claim 1, where at least one of the current program objects included in subset of the current program objects is changed in the software program after the upgrade.

7. The system of claim 6, where the at least one of the current program objects is removed from the software program after the upgrade.

8. The system of claim 6, where the at least one of the current program objects is associated with an unmodified program object, and the unmodified program object is included in the subset of the current program objects because the unmodified program object is associated with the at least one of the current program objects.

9. The system of claim 8, where the unmodified program object comprises a security role and the at least one of the current program objects comprises at least one of a plurality of transaction codes.

10. The system of claim 1, where the one or more processors are further to:
retrieve first state information for a first plurality of default program objects included in a first default installation of the first runtime version of the software program in an unmodified form, where:
the default program objects are second default program objects included in the default installation of the second runtime version of the software program in an unmodified form; and
retrieving the default state information of the plurality of default program objects included in the default installation of the second runtime version of the software program in an unmodified form comprises retrieving default state information that includes differences between the first default program objects and a second plurality of default program objects.

11. The system of claim 1, where the software program in the modified form includes executable code.

12. The system of claim 1, where the one or more processors are further to:
generate a summary report from the upgrade information, where:
at least one of the current program objects being of a certain program object type,
the at least one of the current program objects being associated with one of the current program objects, and
the summary report including a count of the at least one of the current program objects under a column for the certain program object type.

13. The system of claim 1, where the one or more processors are further to:
generate a summary report from the upgrade information, where:
at least one of the current program objects being of a certain program object type,
the at least one of the current program objects being indirectly associated with one of the current program objects, and
the summary report including a count of the at least one of the current program objects under a column for the certain program object type.

14. The system of claim 1, where the one or more processors are further to compare the current state information for the modified form of the first runtime version of the software program with the default state information for the default installation of the second runtime version of the software program in the unmodified form to generate the upgrade information by:
for each of the current program objects:
based on a determination that the current program object in the modified form of the first runtime version of the software program is not obsolete or revised in the default installation of the second runtime version of the software program in the unmodified form, determining whether another current program object in the modified form of the first runtime version of the software program associated with the current program object is obsolete or revised in the default installation of the second runtime version of the software program in the unmodified form; and based on a determination that another current program object in the modified form of the first runtime version of the software program associated with the current program object is obsolete or revised in the default installation of the second runtime version of the software program in the unmodified form, identifying the current program object as impacted.

15. The system of claim 14, where:
determining whether another current program object associated with the current program object is obsolete or revised in the default installation of the second runtime version of the software program comprises determining whether another current program object associated with the current program object is obsolete or revised in the default installation of the second runtime version of the software program; and
identifying the current program object as impacted comprises identifying the current program object as impacted based on a determination that another current program object associated with the current program object is obsolete or revised.

16. The system of claim 1, where generating upgrade information comprises generating a report that includes statistics of impacts on parent roles generated from the upgrade information.

17. The system of claim 16, where generating the report that includes statistics of impacts on parent roles generated from the upgrade information comprises generating a report with rows and columns, where each row in the report corresponds to a parent role that does not have a parent and columns in the report include statistics that indicate a number of a given type of program objects that would change in an upgrade, where the program objects are either directly or indirectly related to the parent role in each row.

18. A system for analyzing an upgrade of a first version of a software program in a modified form to a second version of the software program in the modified form without performing the upgrade, the system comprising:
one or more processors to:
retrieve default state information of a plurality of default program objects included in a default installation of the second version of the software program;
retrieve, from an application database, current state information of a plurality of current program objects included in the first version of the software program in the modified form;
compare the current state information with the default state information to determine upgrade information that identifies a subset of the program objects as being impacted, directly or indirectly through a direct or indirect child relationship, by the upgrade of the first version of the software program in the modified form to the second version of the software program in the modified form; and
generate a report that includes statistics of impacts on parent roles using the upgrade information, where the report indicates, for a parent role:
a number of transaction codes that were changed that are associated with the parent role or with any direct or indirect child role of the parent role,
a number of check indicators that have a check flag value that would be modified in an upgrade and that are associated with a transaction code that is in turn associated with the parent role or with any direct or indirect child role of the parent role,
a number of default authorization objects that would be modified in an upgrade and that are associated with one or more authorization values that are in turn associated with one or more profiles that are in turn associated with the parent role or with any direct or indirect child role of the parent role, and a number of modified authorization objects that include organization element fields and that are associated with the parent role or with any direct or indirect child role of the parent role.

19. The system of claim 18, where the default program objects are first default program objects, the default installation is a first default installation, and the default state information includes differences between the first default program objects and a second plurality of default program objects, and where the second default program objects would be included in a second default installation of the first version of the software program in an unmodified form.

20. A system for analyzing an upgrade of a first version of a software program in a modified form to a second version of the software program in the modified form without performing the upgrade, the system comprising:

one or more processors to:

retrieve default state information of a plurality of default program objects included in a default installation of the second version of the software program, where the default state information comprises a first database table that includes every default transaction code in an enterprise resource planning (ERP) application that would be changed in the upgrade;

retrieve, from an application database, current state information of a plurality of current program objects included in the first version of the software program in the modified form, where the current state information comprises a second database table that includes every role in the ERP application and any associated transaction code and a third database table that includes identification of any associated parent roles and child roles of each of the roles in the ERP application; and compare the current state information with the default state information to generate upgrade information by:
for each of the current program objects:

determining whether a current program object is obsolete or revised in the default installation of the second version of the software program by calculating a number of default transaction codes for the current program object that would be modified and that are associated with a role in the ERP application either directly or indirectly using one or more structured query language (SQL) commands to compare the first database table with the second database table;

based on a determination that the current program object is obsolete or revised, identifying the current program object as impacted;

based on a determination that the current program object is not obsolete or revised, determining whether another current program object that has a direct or indirect child relationship to the current program object is obsolete or revised in the default installation of the second version of the software program by calculating a number of default transaction codes that would be modified and that are associated with a role in the ERP application either directly or indirectly using one or more structured query language (SQL) commands to compare the first database table with the second and third database tables; and based on a determination that another current program object that has the direct or indirect child relationship to the current program object is obsolete or revised, identifying the current program object as impacted; and generate upgrade information that identifies a subset of the current program objects identified as being impacted by the upgrade of the first version of the software program in the modified form to the second version of the software program in the modified form.

* * * * *